H. WORSHAM.
SEAL FOR PACKAGES.
APPLICATION FILED DEC. 26, 1908.
932,228.
Patented Aug. 24, 1909.
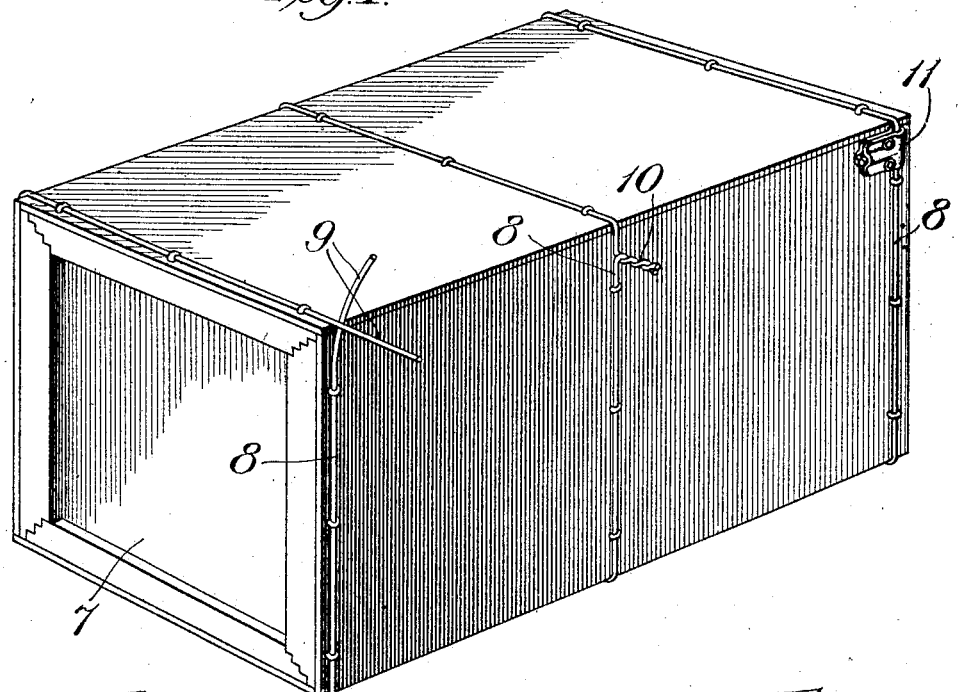
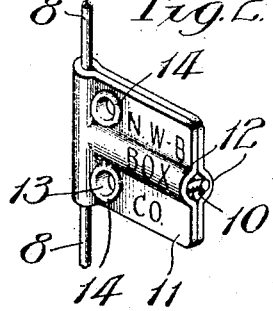
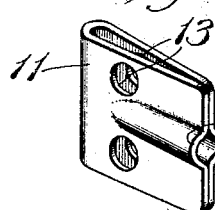
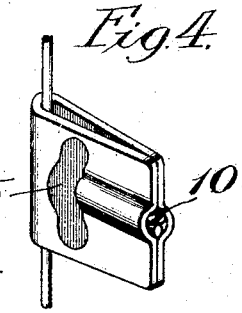
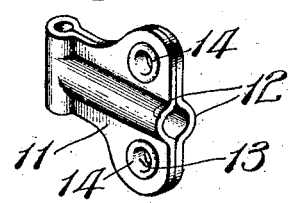
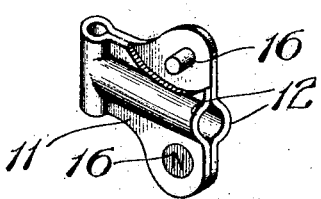
Witnesses:
John Enders
Chas. H. Buell
Inventor:
Hodge Worsham.

UNITED STATES PATENT OFFICE.

HODGE WORSHAM, OF NEW YORK, N. Y., ASSIGNOR TO NATIONAL WIRE BOUND BOX COMPANY, OF SOUTH BEND, INDIANA, A CORPORATION OF INDIANA.

SEAL FOR PACKAGES.

932,228.  Specification of Letters Patent.  Patented Aug. 24, 1909.

Application filed December 26, 1908. Serial No. 469,368.

*To all whom it may concern:*

Be it known that I, HODGE WORSHAM, a citizen of the United States, residing at New York city, in the county of New York and State of New York, have invented a new and useful Improvement in Seals for Packages, of which the following is a specification.

My invention relates to improvements in seals for the united ends of wire or other flexible strands; and my object is, more especially, to provide simple, improved and readily applied means for housing and fastening together the twisted end-portions of binding-wires on shipping cases, to insure the detection of unauthorized tampering with such fastenings and, where desired, display private marks.

In the accompanying drawing, Figure 1 is a wire-bound shipping-case, illustrating the manner of securing and sealing it in accordance with my invention; Fig. 2, a broken enlarged view showing my improved seal of one form applied to the united end-portions of wire strands; Fig. 3, the seal in another form to be applied as shown in Fig. 4; and Figs. 5 and 6, still other forms of the seal.

The box or shipping-case 7 is provided with binding-wires 8 stapled in place in a common manner and having ends 9 which when the cover of the box is closed project beyond the corner of the box, as indicated to the left in Fig. 1. The wire ends are adapted to be united by twisting them together, as indicated at 10 in Fig. 1. The seal 11 consists essentially of a U-shaped strip, of suitable material and having meeting faces, adapted to be passed under the strand 8, at the base of union of the ends 9 when twisted together, and embrace the projecting ends, the seal being provided with means for fastening the meeting faces of the seal together at opposite sides of the twist 10. The body of the seal consists of a strip, preferably of soft metal, such as tin or lead, bent to U-shape and having the central coincident fluted portions 12, either initially provided or formed with the tool or press by means of which the legs of the seal are squeezed to bring the meeting faces of the legs together.

In the construction shown in Fig. 2, coincident openings 13 are provided in each of the legs to extend at opposite sides of the twist 10, the legs being firmly secured together by means of studs, which may be in the form of eyelets 14, passed through the coincident openings and upset in a manner to prevent the seal from being opened without such injury as may be readily detected.

In the construction shown in Figs. 3 and 4, the seal when applied, as described, is secured by pouring molten metal 15, such as lead, through the openings 13 in a manner to form heads on the outer surfaces of the legs.

The constructions shown in Figs. 2, 3 and 4 are forms I prefer to employ when the seal-body is of sheet-tin; while the construction shown in Figs. 5 and 6 are the forms I prefer when the body of the seal is of sheet-lead.

In the construction shown in Fig. 5, the legs of the seal are formed with coincident openings through which eyelets 14, or studs of other suitable type, are passed and upset to lock the meeting faces of the legs together.

In the construction shown in Fig. 6, one of the legs is provided with integral studs 16 cast thereon and adapted to pass through coincident openings in the other leg to be upset as indicated in Fig. 6.

The tool employed in pressing the legs in place around the twist 10 may be caused at the same time to impress letters or other private marks on the legs, as shown in Fig. 2, or on the upset ends of the studs 16, as shown in Fig. 6.

Obviously the seal may be modified in various ways without departing from the spirit of my invention, as defined by the claims.

What I claim as new and desire to secure by Letters Patent is—

1. Means for securing the ends of a strand, when twisted together with the twist projecting at an angle to the strand, comprising, in combination, a folded strip of flexible material extending around the strand, at the base of the twist, and enveloping the twist, and sealing means securing the folds of the strip together.

2. In a sealing device for securing the ends of a strand, when twisted together with the twist projecting at an angle to the strand, a strip of material folded upon itself and extending around the strand at the base of the twist and enveloping the twist, and having stud-receiving openings at opposite sides of the twist.

HODGE WORSHAM.

In the presence of—
CLARENCE L. MILLARD,
F. A. PRAHL